Patented Aug. 22, 1944

2,356,635

UNITED STATES PATENT OFFICE 2,356,635

PROCESS FOR IMPROVING THE BAKING QUALITY OF FLOUR

Ernst Waldschmidt and Anton Bayer, Prague, Moravia and Bohemia; vested in the Alien Property Custodian No Drawing. Application April 3, 1940, Serial No. 327,736. In Germany March 14, 1939

13 Claims. (Cl. 99—90)

The present invention relates to a process for improving the baking quality of flour, especially wheaten flour.

It is known to add to the flour, with the object to improve its baking quality oxidizing agents such as potassium bromate. There are serious objections against the addition of bromine containing compounds in hygienic respect, and in a number of countries the use of bromine compounds is not permitted.

The present invention has therefore also for its object, to substitute for the commonly used potassium bromate substances, the flour improving qualities of which are founded on physiological basis.

It has also become known, to add to the flour calcium salts such as monocalcium phosphate or calcium sulfate. As experiments have shown, the calcium component has in these compounds no specific effects relating to the improvement of the baking quality. Pectins have also been added to the flour, to improve its baking quality. Pectins, however, same as for instance the sodium- or magnesium salts of their decomposition products, cause only a little increase in volume during the baking.

According to the present invention the baking quality of flour, especially wheaten flour, is improved in that, prior or during the making of dough, metal salts of the pectin, which are difficultly soluble in water, are added to the flour. By these additions, a considerable increase of volume of the baked goods is attained compared with baked goods which have been produced without such flour improving additions. The porousness of the baked goods becomes finer, the keeping quality is better, and the becoming stale is retarded. It is supposed that, owing to the colloid character of the pectin salts, the water is more strongly bound in the baked goods, so that this baked goods keeps fresh much longer. Further, by the addition of pectin salts the getting ready of the dough is shortened.

All the metal salts of the pectin which are difficultly or slightly soluble in water such as calcium-, barium-, strontium-, magnesium-, iron-, aluminum-, lead-, zinc salts, and the like possess the above mentioned properties of improving flour or baked ware. According to the invention only such metal salts of the pectin are employed which are physiologically harmless as for instance calcium- or iron pectinate. Mixtures of calcium- and iron pectinate may evidently also be employed. These pectinates are obtained according to the usual processes described in literature.

The quantities of metal salts of the pectin employed for a certain quantity of flour may vary in very wide limits. Quantities of 10–80 gr., especially an addition of about 60 gr., calcium- or iron pectinate to 100 kg. of flour, have shown to be suitable. The favorable results of the process according to the invention have been ascertained in flours of the most different degree of grinding. Especially good results were obtained in doughs with comparatively high fat content.

A further improvement can be attained by the application of the process according to the invention, if the calcium- or iron pectinate is employed together with physiologically harmless carrier substances. Such carrier substances are chiefly digestible substances with nutritive power such as starch products, especially potato- or wheat starch. Flours from cereals have also proved to be suitable. The calcium- or iron pectinate, which at their production are obtained as strongly water containing colloids, are preferably applied in aqueous condition to the carrier substances employed and dried together with the same. The efficiency of the carrier substances which are employed is due to the fact that, at the drying of the calcium- or iron-pectinate they assist in preserving the colloidal properties of the same and thereby their efficiency. For one part carrier substance preferably one part pectinate is used.

It is also advantageous to employ the calcium- or iron pectinate in the form of water containing suspensions or concentrated jellies. These jellies are evaporated so carefully and only to such an extent, that the colloidal condition is not impaired. The more extensively the colloidal properties of the calcium- or iron pectinate are preserved, the more effective they will be as flour improving media.

Hereinafter the process according to the invention will be further explained by means of several examples, however without any intention to limit the invention to the quantity proportions, kinds of flours, additions, working temperatures and the like which are employed.

Example 1

To a mixture of 500 gr. wheaten flour of the type 0 fine, 300 gr. water, 5 gr. yeast, 6 gr. sugar and 7 gr. common salt, 300 mgr. calcium pectinate are added. After the dough has been prepared, it is kneaded and allowed to ferment during 90 minutes. The dough is kneaded and then again allowed to ferment for 30 minutes, again kneaded and again allowed to ferment for 30 minutes. The dough is then shaped and a piece of dough of 750 gr. is made. After the main fermentation baking at approximately 270° C. oven temperature is carried out for 30–35 minutes. The dough temperature during the fermentation amounts to 30° C.

Example 2

5 gr. of yeast are allowed to ferment with a little quantity of flour and 50 ccm. of water for several minutes, whereupon 300 mgr. iron pectinate, either in the form of an aqueous suspension or of a jelly, are added to this mixture.

To this mixture a mixture of 500 gr. flour, 6 gr. sugar and 7 gr. common salt is added. By addition of about 250–270 ccm. of water the dough is prepared, kneaded and allowed to ferment for 90 minutes. The dough is then kneaded, left to ferment during 30 minutes, kneaded again and again left to ferment for 30 minutes. The dough is then shaped so that the piece of dough weighs 750 gr., and this piece is left 70 minutes to a last fermentation. The dough is then baked 30–35 minutes at 270° C. The temperature of the dough during the fermentation amounts to 30° C.

Example 3

5 gr. yeast are allowed to ferment with a little quantity of flour and 50 ccm. water for a few minutes, whereupon to this preparation 600 mgr. of a mixture are added which consists of 300 mgr. calcium pectinate or iron pectinate and 300 mgr. starch flour. This mixture has been obtained by allowing to dry upon starch flour an aqueous suspension of calcium- or iron pectinate.

500 gr. flour, 6 gr. sugar, and 7 gr. common salt are added to the above mentioned preparation. The further treatment is carried out according to Example 2.

In the following tabula the results are stated which are obtained by the flour improving media according to the invention in comparison with the known media:

| Addition | Main fermentation time | Volume of baked goods | Height of baked goods |
|---|---|---|---|
|  | Mgrs. | Minutes | Ccm. | Mm. |
| Control (experiment without addition) |  | 70 | 1,944 | 135 |
| Calcium pectinate | 300 | 55–60 | 2,520 | 175 |
| Iron pectinate | 300 | 60 | 2,480 | 165 |
| Mixture of 300 mgr. calcium pectinate and 300 mgr. starch | 600 | 58 | 2,560 | 175 |
| Potassium bromate | 24 | 70 | 2,520 | 175 |
| Calcium chloride | 25 | 70 | 1,944 | 135 |
| Do | 50 | 65 | 2,304 | 160 |
| Beet pectin | 100 | 70 | 2,088 | 145 |

The comparative experiments according to the preceding tabula have been carried out with wheaten flour 0 fine under the working conditions of the Example 1. Compared with the employment of potassium bromate a shortening of the main fermentation time has been ascertained. The volume of the baked goods is approximately similar as when potassium bromate is used, but the advantage of the pectinates employed according to the invention consists therein that they represent physiologically utilizable substances, whereas the bromates have to be considered as foreign substances.

By the term "difficultly soluble" as used herein is meant those metal pectinates which are only slightly soluble in water, having an order of solubility equal to the solubilities of the pectinates of calcium, barium, strontium, magnesium, iron, aluminum, lead and zinc.

We claim:

1. Baked goods comprising a flour mixture having disseminated therein a small proportion of a metal salt of pectin which is physiologically harmless and difficultly soluble in water, said goods having a substantially greater volume than similar goods baked without said salt.

2. Baked good comprising a flour mixture having disseminated therein a small proportion of a metal salt of pectin which is physiologically harmless and difficultly soluble in water taken from the class consisting of the calcium and iron salts, said goods having a substantially greater volume than similar goods baked without said salt.

3. Baked goods comprising a fermented flour mixture having disseminated therein a small proportion of a metal salt of pectin which is physiologically harmless and difficultly soluble in water, said goods having a substantially greater volume than similar goods baked without said salt.

4. Baked goods comprising a fermented flour mixture having disseminated therein a small proportion of a metal salt of pectin which is physiologically harmless and difficultly soluble in water taken from the class consisting of the calcium and iron salts, said goods having a substantially greater volume than similar goods baked without said salt.

5. Process for improving the baking quality of flour, consisting in adding to and incorporating in the flour, at a stage not later than during the preparation of the dough, metal salts of pectin selected from the group of physiologically harmless metal salts of pectin which are difficultly soluble in water.

6. Process for improving the baking quality of flour, consisting in adding to and incorporating in the flour, at a stage not later than during the preparation of the dough, the calcium salt of pectin.

7. Process for improving the baking quality of flour, consisting in adding to and incorporating in the flour, at a stage not later than during the preparation of the dough, the iron salt of pectin.

8. Process as specified in claim 5, in which a salt of pectin taken from the class consisting of the calcium and iron salts is employed in a quantity of 10–80 gr. for 100 kg. of flour.

9. Process as specified in claim 5, in which a salt of pectin taken from the class consisting of the calcium and iron salts is employed in a quantity of 60 gr. for 100 kg. of flour.

10. Process as specified in claim 5, consisting in the employment of a salt of pectin taken from the class consisting of the calcium and iron salts on digestible carrier substances.

11. Process for the improvement of the baking quality of flour, consisting in adding to and incorporating in the flour, at a stage not later than during the preparation of the dough, metal salts of pectin, selected from the group of physiologically harmless metal salts of the pectin which are difficultly soluble in water, taken from the class consisting of the calcium and iron salts, said metal salts of pectin being applied on wheat starch, potato starch and cereal flours.

12. Process as specified in claim 11, in which for one part of carrier substance about one part of the salt is employed.

13. Process as specified in claim 5, consisting in the employment of the salt in the form of a water containing jelly.

ERNST WALDSCHMIDT.
ANTON BAYER.